United States Patent
Semper

(10) Patent No.: US 7,483,436 B2
(45) Date of Patent: Jan. 27, 2009

(54) SYSTEM AND METHOD FOR ESTABLISHING MOBILE STATION-TO-MOBILE STATION PACKET DATA CALLS DIRECTLY BETWEEN BASE STATIONS OF A WIRELESS NETWORK

(75) Inventor: William Joseph Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 948 days.

(21) Appl. No.: 10/695,232

(22) Filed: Oct. 28, 2003

(65) Prior Publication Data

US 2005/0090260 A1 Apr. 28, 2005

(51) Int. Cl.
*H04M 1/00* (2006.01)
*H04L 12/28* (2006.01)

(52) U.S. Cl. .............................. 370/395.52; 455/414.3; 455/439; 455/466

(58) Field of Classification Search ................. 455/439, 455/414.3, 466; 370/913, 395.52
See application file for complete search history.

(56) References Cited

U.S. PATENT DOCUMENTS

| | | | | |
|---|---|---|---|---|
| 5,479,409 A * | 12/1995 | Dupuy et al. | ............... | 370/337 |
| 6,317,607 B1 * | 11/2001 | Tomcik et al. | ........... | 455/552.1 |
| 6,317,609 B1 * | 11/2001 | Alperovich et al. | ....... | 455/556.1 |
| 6,374,112 B1 * | 4/2002 | Widegren et al. | ........ | 455/452.2 |
| 6,404,754 B1 * | 6/2002 | Lim | ............................ | 370/338 |
| 6,466,779 B1 * | 10/2002 | Moles et al. | ................ | 455/410 |
| 6,512,754 B2 * | 1/2003 | Feder et al. | .................. | 370/338 |
| 6,594,276 B1 * | 7/2003 | Le | ............................... | 370/465 |
| 6,965,584 B2 * | 11/2005 | Agrawal et al. | ............. | 370/331 |
| 6,999,766 B1 | 2/2006 | Padovani | | |
| 7,002,959 B2 * | 2/2006 | Suzuki et al. | ................ | 370/393 |
| 7,058,076 B1 * | 6/2006 | Jiang | ........................... | 370/465 |
| 7,242,674 B2 * | 7/2007 | Jin | .............................. | 370/329 |
| 7,343,161 B2 * | 3/2008 | Shin | ........................... | 455/445 |
| 7,346,007 B2 * | 3/2008 | Curcio et al. | ................ | 370/252 |
| 2002/0037712 A1 * | 3/2002 | Shin | ........................... | 455/414 |
| 2002/0057657 A1 | 5/2002 | La Porta et al. | | |
| 2002/0077096 A1 | 6/2002 | Jin | | |
| 2003/0119518 A1 * | 6/2003 | Cleveland et al. | ........... | 455/450 |
| 2003/0169768 A1 * | 9/2003 | Bienn et al. | .................. | 370/469 |
| 2004/0005884 A1 | 1/2004 | Nieminen et al. | | |
| 2004/0203640 A1 * | 10/2004 | Molander et al. | ........ | 455/414.1 |
| 2004/0259596 A1 * | 12/2004 | Rajkotia et al. | ............. | 455/561 |
| 2005/0089007 A1 * | 4/2005 | Semper | ...................... | 370/349 |
| 2005/0099998 A1 * | 5/2005 | Semper | ...................... | 370/352 |

* cited by examiner

*Primary Examiner*—Fan Tsang
*Assistant Examiner*—Lisa Hashem

(57) ABSTRACT

A wireless network that provides a packet data call connection between a source mobile station (MS) and a destination mobile station (MS) in a coverage area of the wireless network. The wireless network comprises a first base station that wirelessly communicates with the source mobile station, a second base station that wirelessly communicates with the destination mobile station, and a mobile switching center that connecting the first and second base stations. The first base station receives a first message from the source mobile station requesting a MS-MS packet data call connection to the destination mobile station. In response to the first message, the first base station initiates establishment of the MS-MS packet data call connection on a local IP network coupling the first and second base stations.

23 Claims, 4 Drawing Sheets

SYSTEM AND METHOD FOR ESTABLISHING MOBILE STATION-TO-MOBILE STATION PACKET DATA CALLS DIRECTLY BETWEEN BASE STATIONS OF A WIRELESS NETWORK

CROSS-REFERENCE TO RELATED APPLICATIONS

The present invention is related to that disclosed in U.S. patent application Ser. No. 10/695,595, entitled "SYSTEM AND METHOD FOR PERFORMING HANDOFFS OF MOBILE STATION-TO-MOBILE STATION PACKET DATA CALLS IN A WIRELESS NETWORK" and filed concurrently with the present application. The subject matter disclosed in patent application Ser. No. 10/695,595 is hereby incorporated by reference into the present application as if fully set forth herein.

TECHNICAL FIELD OF THE INVENTION

The present invention relates to wireless communication systems and, more specifically, to a system and a related method for making packet data calls between mobile stations in a wireless network.

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (i.e., vending machine with cellular capability). Wireless service providers continually try to create new markets for wireless devices and expand existing markets by making wireless devices and services cheaper and more reliable. The price of wireless devices has decreased to the point where these devices are affordable to nearly everyone and the price of a wireless device is only a small part of the total cost to the user (i.e., subscriber). To continue to attract new customers, wireless service providers are implementing new services, especially digital data services that, for example, enable a user to browse the Internet and to send and receive e-mail.

Subscribers have shown great interest in using high-speed applications between mobile stations in wireless networks. Many of these high-speed applications (e.g., video phones) require a radio access network (RAN) that supports streaming data applications. A streaming data application must be transported over constant bandwidth with low delay and low levels of jitter. However, current wireless networks, such as cdma2000 RANs, often experience problems when supporting streaming data applications. Packet data transmissions between a base station (BS) and a mobile station (MS) experience delay and jitter at numerous points in the network, including at the air interface between the MS and the BS and at the interface between the BS and the packet data serving node (PDSN).

Delays and jitter would be minimized if streaming data could be transmitted more directly between mobile stations, without passing through some infrastructure of the radio access network (RAN), such as the PDSN. However, the well-known RAN signaling messages specified in TIA-2001-C, "Interoperability Specification for cdma2000 Access Network Interfaces", Jun. 2003, (hereafter, simply "the TIA-2001-C standard") and other standards do not provide for direct mobile-to-mobile (MS-MS) packet data calls. The TIA-2001-C standard only allows for mobile originated packet data calls.

All packet data calls use control signals that connect the base station (BS) serving the mobile station (MS) that originates a packet data call to a packet data serving node (PDSN). All data transmitted by a source mobile station is transferred through the PDSN to a packet data network. In the case of MS-MS packet data calls, the data is then transferred back to a base station of the wireless network for subsequent transmission to a destination MS. Obviously, transferring the data up to, and then back from, the PDSN is unnecessary and introduces delays. Additionally, the added signaling needed to establish connections to the PDSN increases call set up time and decreases success rates.

U.S. patent application No. 20,020,077,096 (hereafter, the "Jin application") discloses a method for providing mobile station-to-mobile station data calls, provided the same base station (BS) serves both mobile stations. The method disclosed in the Jin application establishes MS-MS packet data calls without requiring connections between the BS and the PDSN. However, as noted, the mobile stations must be located in cells served by a single base station. This may be acceptable in a small wireless network that uses a single base station (e.g., a home or small office network). However, if a wireless network operator deploys a RAN with many base stations, this is a severe limitation. Subscribers who are distant from each other are served by different base stations and cannot engage in a MS-to-MS streaming data application without going through the PDSN and a wide area packet data network.

Therefore, there is a need for improved wireless networks that provide mobile station-to-mobile station (MS-MS) packet data connections that have low delay and low jitter characteristics. In particular, there is a need for a wireless network that provides a MS-MS packet data connection from a first base station to a second base station that does not require a packet data serving node and a wide-area packet data network. More particularly, there is a need for a wireless network that enables an MS-MS packet data connection handled by a first base station and a second base station to be transferred from the first base station to a third base station if one of the mobile stations is handed off from the first base station to the third base station.

SUMMARY OF THE INVENTION

The present invention enables a cdma2000 wireless network to quickly connect two mobile stations that require a streaming data flow (e.g., a video phone call). The present invention accomplishes this by modifying the well-known radio access network (RAN) signaling messages standardized in TIA-2001-C, "Interoperability Specification for cdma2000 Access Network Interfaces", Jun. 2003.

To address the above-discussed deficiencies of the prior art, it is a primary object of the present invention to provide a wireless network that provides a packet data call connection between a source mobile station (MS) and a destination mobile station (MS) in a coverage area of the wireless network. According to an advantageous embodiment of the present invention, the wireless network comprises: i) a first base station capable of wirelessly communicating with the source mobile station; ii) a second base station capable of wirelessly communicating with the destination mobile station; and iii) a mobile switching center capable of connecting the first and second base stations, wherein the first base station is capable of receiving a first message from the source mobile station requesting a MS-MS packet data call connection to the destination mobile station and, in response to the first message, the first base station initiates establishment of the MS-MS packet data call connection on a local IP network coupling the first and second base stations.

According to one embodiment of the present invention, the first base station responds to the first message by transmitting a second message to the mobile switching center, the second message indicating that the MS-MS packet data call connection to the destination mobile station is requested.

According to another embodiment of the present invention, the mobile switching center responds to the second message by transmitting a third message to the second base station, the third message indicating that the MS-MS packet data call connection is requested.

According to still another embodiment of the present invention, the second base station responds to the third message by transmitting a fourth message to the mobile switching center, the fourth message containing an IP address of the second base station on the local IP network.

According to yet another embodiment of the present invention, the mobile switching center responds to the fourth message by transmitting a fifth message to the first base station, the fifth message containing the IP address of the second base station and a mobile identifier value associated with the destination mobile station.

According to a further embodiment of the present invention, the first base station responds to the fifth message by using the IP address of the second base station to establish a packet data bearer connection to the second base station via the local IP network.

According to a still further embodiment of the present invention, the first base station transmits the mobile identifier of the destination mobile station to the second base station in order to identify data packets from the source mobile station that are directed to the destination mobile station.

The foregoing has outlined rather broadly several features of this disclosure so that those skilled in the art may better understand the Detailed Description of the Invention that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of the present invention, and the advantages thereof, reference is made to the following descriptions and the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless communication network.

Figure 1:
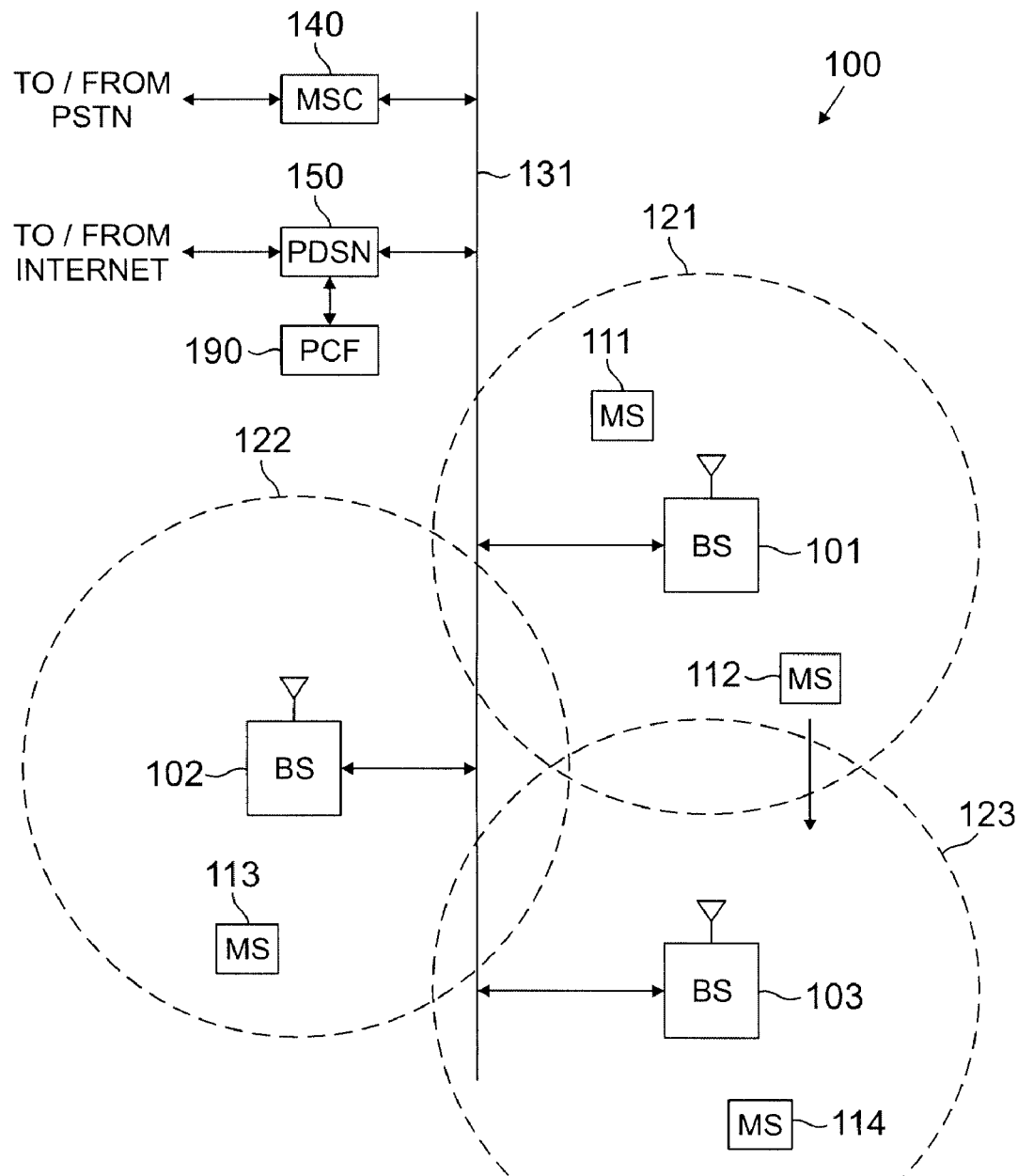
FIG. 1 illustrates a wireless network in which the supplemental channel (SCH) may be dynamically allocated according to the principles of the present invention.

FIG. 1 illustrates an exemplary wireless network in which the supplemental channel (SCH) may be dynamically allocated to a single mobile station according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to the IS-2000-C standard (i.e., Release C of cdma2000). Mobile stations 111-114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., monitoring devices with wireless capability).

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), where a directional antenna coupled to the base station illuminates each sector. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of base stations 101-103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like. According to an advantageous embodiment of the present invention, line 131 also provides an Internet Protocol (IP) connection that transfers data packets between the base stations of wireless network 100, including BS 101, BS 102 and BS 103. Thus, line 131 comprises a local area network (LAN) that provides direct IP connections between base stations without using PDSN 150.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a handoff will occur.

According to the principles of the present invention, the mobile stations in wireless network 100 are capable of executing streaming data applications (e.g., video phone). To facilitate these high-speed applications, the present invention provides low latency, low delay IP connections between base stations via line 131, without sending data packets through PDSN 150. The present invention comprises a system and method of messaging (based on the TIA-2001-C standard) between the base stations of a cdma2000 radio access network (RAN).

The present invention is based on the following assumptions:

i) Both mobile stations are currently in cells that are under the control of a single mobile switching center (i.e., MSC 140);
ii) An IP-based packet switched network (i.e., line 131) connects all base stations under the control of MSC 140;
iii) All billing for the MS-MS data call is done at MSC 140 and is based only on air time; and
iv) The MS-MS data call does not go dormant (i.e., both mobile stations stay on the traffic channels for the duration of the data call).

The proposed invention can be implemented using the well-known cdma2000 RAN architecture as described in the TIA-2001-C standard. FIG. 1 shows this architecture and the entities that comprise wireless network 100. In the example described below, two mobile stations (i.e., MS 111 and MS 113) are served by two separate base stations (i.e., BS 101 and BS 102) that are connected via an IP-based packet switched network (line 131) as defined in the TIA-2001-C standard. Both base stations are attached to MSC 140 via interfaces defined in the TIA-2001-C standard. MS 111 and MS 113 communicate with the base stations of wireless network 100 using messaging defined in the air interface standard TIA-2000-C, "cdma2000 Spread Spectrum Systems", May 2002.

Figure 2:
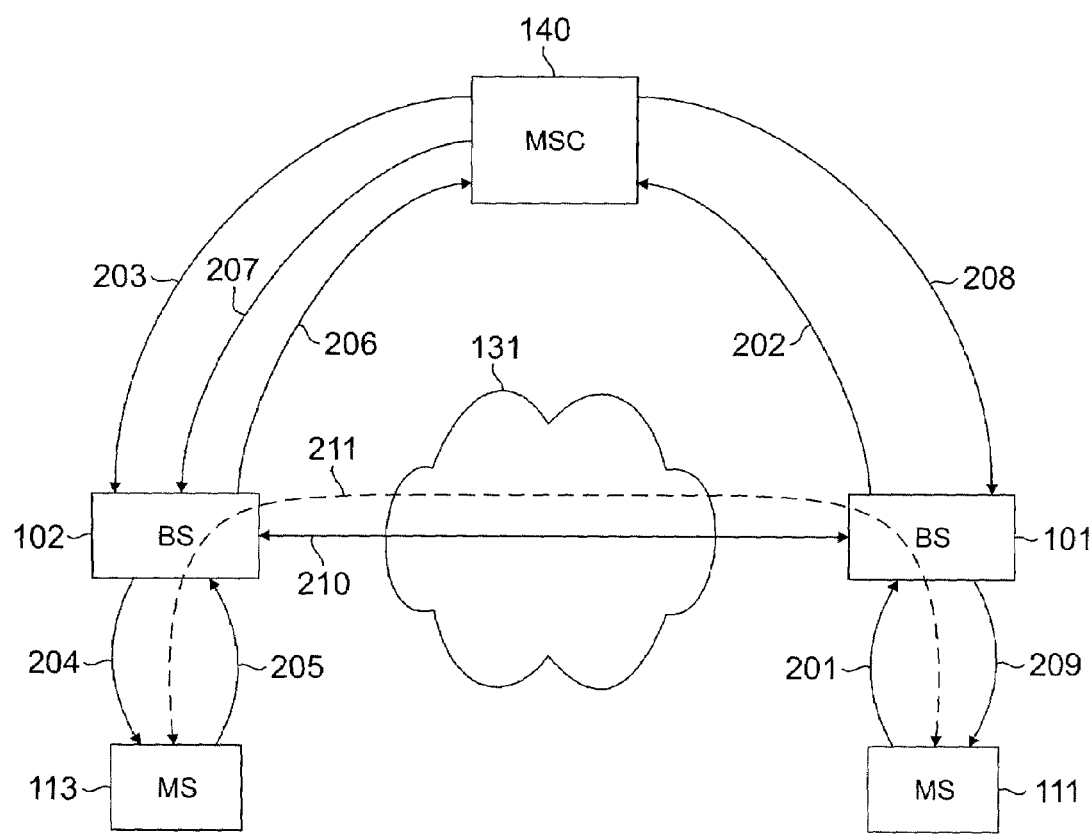
FIG. 2 is a message flow diagram illustrating the set up of a mobile station-to-mobile station packet data call according to the principles of the present invention.

FIG. 2 is a message flow diagram illustrating the set up of a mobile station-to-mobile station (MS-MS) packet data call according to the principles of the present invention. FIG. 2 shows line 131 as a network cloud in order to illustrate the operation of the present invention. Thereafter, the description below will frequently use the term "IP network 131" to refer to line 131.

A source mobile station (i.e., MS 111) initiates an MS-MS packet data call by transmitting Origination message 201 with a service option (SO) data field that indicates an MS-MS packet data call. Message 201 also contains the number of the destination (or dialed) mobile station (MS 113). BS 101 sends CM Service Request message 202 to MSC 140 indicating the SO and the phone number of destination MS 113. The acronym "CM" is attributed various meanings by persons of skill in the art of CDMA wireless communication networks. for example: Connection Management, Communication Management, and Configuration Management. BS 101 also begins to establish a traffic channel to MS 111 at this time.

MSC 140 authenticates both MS 111 and MS 113 to verify that both devices are permitted to access wireless network 100. MS 140 also verifies that MS 111 and MS 113 are both authorized to use the MS-MS packet data call service. MSC 140 finds MS 113 in the service area and sends Paging Request message 203 to BS 102, which is the last base station on which MS 113 registered. In response, BS 102 transmits Page message 204 to MS 113 with an indication (SO) of an incoming packet data call. MS 113 transmits Response message 205 indicating MS 113 will accept the packet data call.

Next, BS 102 sends Paging Response message 206 to MSC 140 indicating that MS 113 has responded to Page message 204. BS 102 also indicates its own IP Network address in message 206. Thus, MSC 140 is aware of the IP address of BS 102 on IP network 131. MSC 140 sends Assignment Request message 207 to BS 102 to begin setting up the packet data call. BS 102 uses conventional air interface messaging to establish a traffic channel to MS 113. When BS 102 finishes establishing the traffic channel to MS 113, BS 102 sends Assignment Complete message (not shown) to MSC 140 to indicate that the packet data call connection has been established between BS 102 and MS 113.

Meanwhile, MSC 140 also sends Assignment Request message 208 to BS 101 to notify BS 101 that destination MS 113 has been located and the packet data call is being set up. Message 208 contains the IP address of BS 102 on IP network 131. Message 208 also contains the mobile identifier (IMSI or ESN) of MS 113. If not already completed, BS 101 finishes establishing the traffic channel connection to MS 111 (message 209). When this traffic channel is finally set up, BS 101 sends an Assignment Complete message (not shown) to MSC 140 indicating that packet data call connection has been established between BS 101 and MS 111.

Using the IP network address of BS 102 provided by MSC 140, BS 101 establishes packet data bearer connection 210 to BS 102 using messaging as defined in the TIA-2001-C standard. Packet data bearer connection 210 carries data packet traffic associated with the MS-MS call between BS 101 and BS 102. The control messages between BS 101 and BS 102 include the mobile identifier of MS 113, so that BS 102 can associate packet data bearer connection 210 with the packet data call to MS 113. All of the data packets that each of base stations 101 and 102 thereafter receive from one of mobile stations 111 and 113, respectively, are sent over packet data bearer connection 210 to the other base station for subsequent transmission to the other mobile station. This establishes the RAN traffic link for the call.

Finally, MS 111 and MS 113 establish a link layer connection (indicated by dotted line 211). This may be, for example, a Point-to-Point Protocol (PPP) connection. Once the link layer is established, mobile stations 111 and 113 can exchange packet data with each other (e.g., for a video call).

In order to establish a connection between base stations 101 and 102 via IP network 131, the present invention requires the following specific changes to conventional cdma2000 RAN messaging:

i) a new MS-MS packet data service option is defined that allows a mobile station to initiate or receive MS-MS packet data calls and to alert wireless network 100 that the new call is a MS-MS packet data call;

ii) the IP network address of base station 102 must be added to Assignment Request message 208 and Paging Response message 206, so that MSC 140 can forward the IP address of the destination base station (BS 102) to the source base station (BS 101). This is needed to establish the BS-BS data link through IP network 131; and iii) for the inter-BS messaging that establishes the IP network link, a new indicator is added that informs the destination base station (i.e., BS 102) that the packet data bearer connection is for an MS-MS call.

Figure 3:
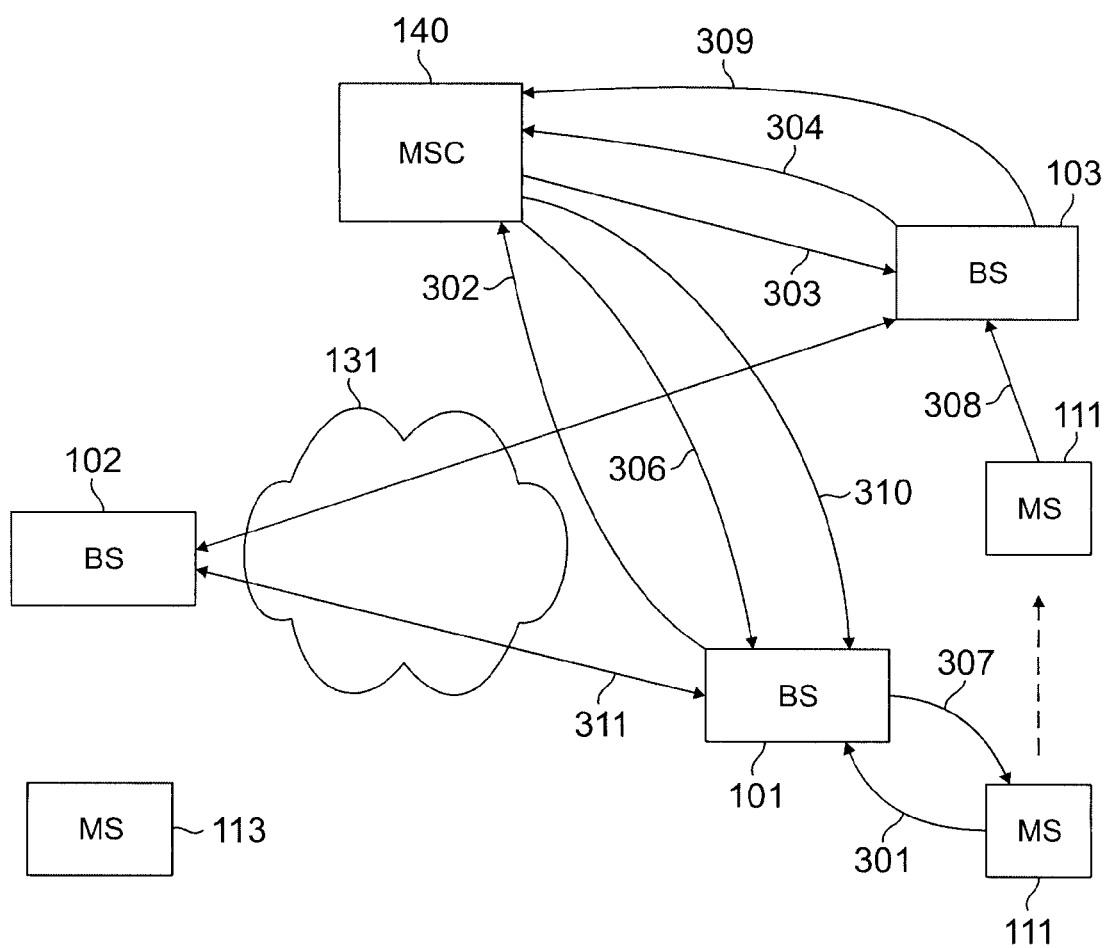
FIG. 3 is a message flow diagram illustrating the handoff between base stations of a mobile station-to-mobile station packet data call according to the principles of the present invention.

FIG. 3 is a message flow diagram illustrating the handoff between base stations 101 and 103 of a mobile station-to-mobile station packet data call according to the principles of the present invention. In FIG. 3, it is assumed that the MS-MS packet data call between MS 111 and MS 113 via BS 101 and BS 102, as described above in FIG. 2, is already in existence. At some point, MS 111 moves out of the coverage area of BS 101 and into the coverage area of BS 103, as indicated by the dotted line. When this happens, MS 111 is handed off from BS 101 to BS 103. In order to prevent the MS-MS packet data call from being dropped, BS 103 must assume the role that BS 101 previously performed. Thus, the MS-MS packet data call also must be handed off from BS 101 to BS 103.

In this scenario, MSC 140 exchanges messages with each of BS 101, BS 102 and BS 103 based on the TIA-2001-C standard. Similarly, BS 101, BS 102 and BS 103 exchange messages with each other based on the TIA-2001-C standard. MS 111 exchanges messages with BS 101 and BS 103 based on the TIA-2000-C standard.

Initially, MS 111 sends pilot strength measurements to BS 101 in message 301 indicating that a handoff to the target cell covered by BS 103 is required. BS 101 responds by sending Handoff Required message 302 to MSC 140. Message 302 includes the service option (SO) for the MS-MS packet data call, the call identifier that BS 101 and BS 102 are using for the MS-MS packet data call, the mobile identifiers for MS 111 and MS 113, and the IP Network Address of BS 102. MSC 140 determines that the target cell belongs to a base station (i.e., BS 103) under the control of MSC 140 and sends Handoff Request message 303 to BS 103.

Handoff Request message 303 contains the same information MSC 140 received from BS 101 in Handoff Required message 302. BS 103 prepares to receive MS 111 and sends Handoff Request Acknowledgment message 304 to MSC 140 indicating that BS 103 accepts the handoff request. At the same time, BS 103 begins to establish packet data bearer connection 305 with BS 102 using the IP address, mobile identifier, and call identifier that BS 103 received from MSC 140. Once packet data bearer connection 305 is established, BS 102 transmits all data meant for MS 111 to both BS 101 and BS 103 and prepares to receive data from either one of BS 101 and BS 103.

MSC 104 sends Handoff Command message 306 to BS 101, indicating that BS 103 is ready to receive the handoff. BS 101 sends handoff direction message 307 (e.g., Extended Handoff Direction Message 307, Universal Handoff Direction Message 307, etc.) to MS 111 instructing MS 111 to begin sending and receiving information on the target cell covered by BS 103. When MS 111 acquires BS 103, MS 111 sends Handoff Completion Message 308 to BS 103. The MS-MS packet data call has now been handed off from BS 101 to BS 103. MS 111 and MS 113 continue to exchange data through packet data bearer connection 305 established between BS 102 and BS 103.

Next, BS 103 sends Handoff Complete message 309 to MSC 140 after MS 111 is successfully acquired. MSC 140 sends Clear Command message 310 to BS 101 to indicate that MS 111 has been successfully acquired by BS 103. BS 101 sends messaging to tear down packet data bearer connection 311 with BS 102. BS 102 stops sending data destined for MS 111 to BS 101. After this is completed, BS 101 sends a Clear Complete message (not shown) to MSC 140 to indicate that the MS-Ms packet data call has been cleared on BS 101.

In order to handoff the connection between base stations via IP network 131, the present invention requires the following specific changes to conventional cdma2000 RAN messaging:

i) Handoff Required message 302 and Handoff Request message 303 (as defined in the TIA-2001-C standard) must include the new service option (SO) for MS-MS packet data calls, as well as the mobile identifier for MS 113, and the IP Network Address of BS 102; and ii) Changes to the BS-BS messaging are required, similar to those described for FIG. 2.

Figure 4:
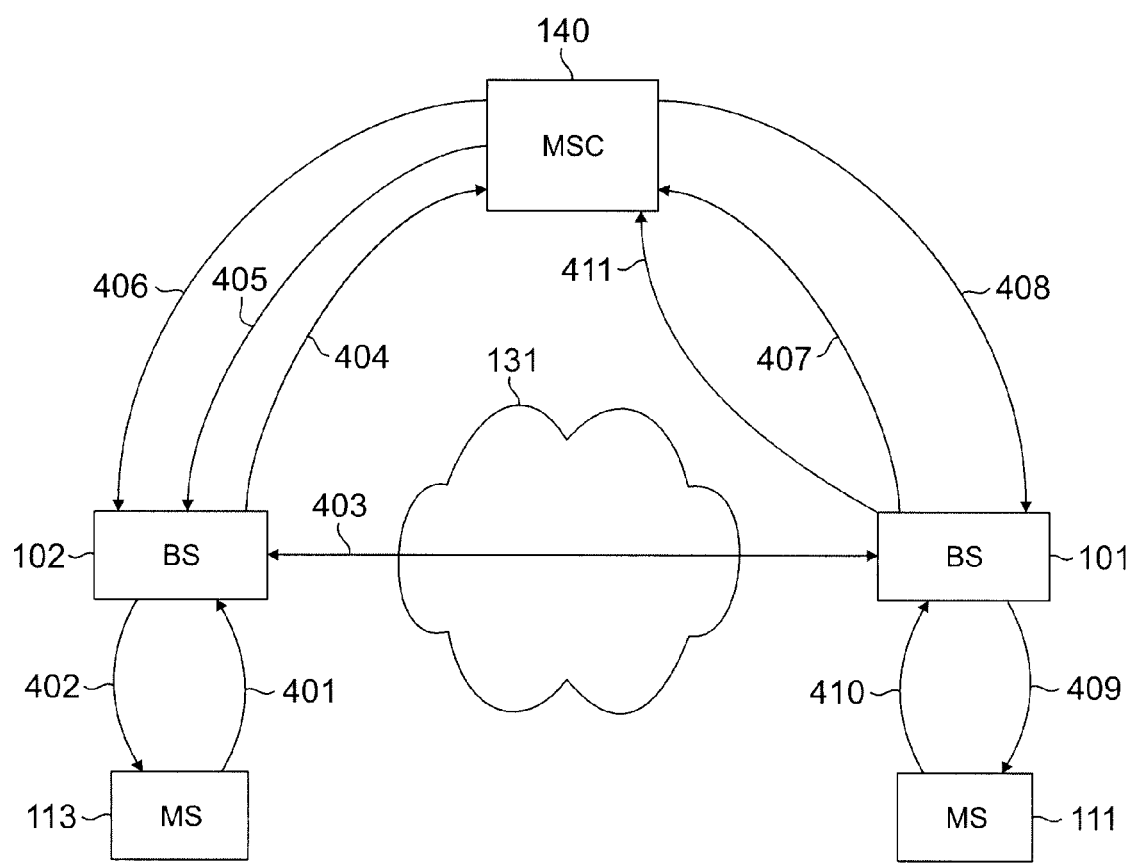
FIG. 4 is a message flow diagram illustrating the tear down of a mobile station-to-mobile station packet data call according to the principles of the present invention.

FIG. 4 is a message flow diagram illustrating the tear down of a mobile station-to-mobile station packet data call according to the principles of the present invention. In this scenario, MSC 140 exchanges messages with each of BS 101 and BS 102 based on the TIA-2001-C standard. Similarly, BS 101 and BS 102 exchange messages with each other based on the TIA-2001-C standard. MS 111 exchanges messages with BS 101 and BS 102 based on the TIA-2000-C standard.

At some point, one mobile station (MS 113 in this example) terminates the MS-MS packet data call. To do this, MS 113 sends Release Order message 401 to BS 102 to release the call. BS 102 transmits message 402 to acknowledge receipt of Release Order message 401 and drops the traffic channel to MS 113. BS 102 notifies BS 101 on packet data bearer connection 403 of IP network 131 that connection 403 must be torn down. This also notifies BS 101 that BS 101 no longer needs to support the MS-MS packet data call.

BS 102 sends Clear Request message 404 to MSC 140 to request that the MS-MS packet data call be released. MSC 140 responds by transmitting Clear Command message 405 to BS 102 to release the MS-MS packet data call. BS 102 then sends Clear Complete message 406 to MSC 140 after all resources have been released.

After receiving the indication from BS 102 that packet data bearer connection 403 on IP network 131 is being torn down, BS 101 sends Clear Request message 407 to MSC 140 to request that the MS-MS packet data call be released. MSC 140 sends Clear Command message 408 to BS 102 to release the MS-MS packet data call. BS 101 transmits Release Order message 409 to MS 111 to release the traffic channel. MS 111 transmits message 410 to acknowledge the receipt of Release Order message 409. At this point, the traffic s channel is released. BS 101 sends Clear Complete message 411 to MSC 140 after all resources are released.

The above-described tear down scenario may be accomplished using existing messaging as defined in the TIA-2001-C standard. It is noted that mobile station 111 and 113 may release the MS-MS packet data call simultaneously. MSC 140 keeps track of accounting for each mobile station.

The present invention enables direct MS-to-MS packet data calls. Utilizing direct BS-to-BS signaling on IP network 131 bypasses PDSN 150, thereby allowing for faster call setup and handoff.

Although the present invention has been described in detail, those skilled in the art should understand that they may make various changes, substitutions and alterations herein without departing from the spirit and scope of the invention in its broadest form.

What is claimed is:

1. A wireless network for providing a packet data call connection between a source mobile station (MS) and a destination mobile station (MS) in a coverage area of said wireless network, said wireless network comprising:
    a first base station capable of wirelessly communicating with said source mobile station;
    a second base station capable of wirelessly communicating with said destination mobile station; and
    a mobile switching center capable of connecting said first and second base stations, wherein said mobile switching center is capable of controlling said source mobile station and said destination mobile station, wherein said mobile switching center promotes streaming data applications through the packet data call connection, and wherein said first base station is capable of receiving a first message from said source mobile station requesting an MS-MS packet data call connection to said destination mobile station and, in response to said first message, said first base station initiates establishment of said MS-MS packet data call connection on a local Internet Protocol (IP) network coupling said first and second base stations by transmitting an IP address of said first base station.

2. The wireless network as set forth in claim 1, wherein said first message comprises an Origination message having a service option field indicating that said MS-MS packet data call connection is requested.

3. The wireless network as set forth in claim 1, wherein said first base station responds to said first message by transmitting a second message to said mobile switching center, said second message indicating that said MS-MS packet data call connection to said destination mobile station is requested.

4. The wireless network as set forth in claim 3, wherein said second message comprises a CM Service Request message containing said service option indicating that said MS-MS packet data call connection is requested and containing a phone number associated wit said destination mobile station and said IP address of said first base station.

5. The wireless network as set forth in claim 3, wherein said mobile switching center responds to said second message by transmitting a third message to said second base station, said third message indicating that said MS-MS packet data call connection is requested.

6. The wireless network as set forth in claim 5, wherein said third message is a Paging Request message.

7. The wireless network as set forth in claim 5, wherein said second base station responds to said third message by transmitting a fourth message to said mobile switching center, said fourth message containing an IP address of said second base station on said local IP network.

8. The wireless network as set forth in claim 7, wherein said fourth message comprises a Paging Response message.

9. The wireless network as set forth in claim 7, wherein said mobile switching center responds to said fourth message by transmitting a fifth message to said first base station, said fifth message containing said IP address of said second base station and a mobile identifier value associated with said destination mobile station.

10. The wireless network as set forth in claim 9, wherein said fifth message comprises an Assignment Request message containing said IP address of said second base station and said mobile identifier value.

11. The wireless network as set forth in claim 9, wherein said first base station responds to said fifth message by using said IP address of said second base station to establish a packet data bearer connection to said second base station via said local IP network.

12. The wireless network as set forth in claim 11, wherein said first base station transmits said mobile identifier of said destination mobile station to said second base station in order to identify data packets from said source mobile station that are directed to said destination mobile station.

13. For use in a wireless network comprising: i) a first base station that wirelessly communicates with a source mobile station (MS), ii) a second base station that wirelessly communicates with a destination mobile station (MS), and iii) a mobile switching center that connects the first and second base stations, a method of providing a MS-MS packet data call connection between the source mobile station and the destination mobile station comprising the steps of:
    in the first base station, receiving a first message from the source mobile station requesting a MS-MS packet data call connection to the destination mobile station;
    in response to the first message, establishing the MS-MS packet data call connection on a local Internet Protocol (IP) network coupling the first and second base stations by transmitting an IP address of said first base station, wherein said mobile switching center is capable of controlling said MS-MS packet data call connection, and wherein said mobile switching center promotes streaming data applications through the MS-MS packet data call connection.

14. The method as set forth in claim 13, wherein the first message comprises an Origination message having a service option field indicating that the MS-MS packet data call connection is requested.

15. The method as set forth in claim 13, further comprising the step of transmitting a second message from the first base station to the mobile switching center, the second message indicating that the MS-MS packet data call connection to the destination mobile station is requested.

16. The method as set forth in claim 15, wherein the second message comprises a CM Service Request message containing the service option indicating that the MS-MS packet data call connection is requested and containing a phone number associated with the destination mobile station.

17. The method as set forth in claim 15, further comprising the step of transmitting a third message from the mobile switching center to the second base station in response to the second message, the third message indicating that the MS-MS packet data call connection is requested.

18. The method as set forth in claim 17, wherein the third message is a Paging Request message.

19. The method as set forth in claim 17, further comprising the step of transmitting a fourth message from the second base station to the mobile switching center in response to the third message, the fourth message containing an IP address of the second base station on the local IP network.

20. The method as set forth in claim 19, wherein the fourth message comprises a Paging Response message.

21. The method as set forth in claim 19, further comprising the step of transmitting a fifth message from the mobile switching center to the first base station in response to the fourth message, the fifth message containing the IP address of the second base station and a mobile identifier value associated with the destination mobile station.

22. The method as set forth in claim 21, wherein the fifth message comprises an Assignment Request message containing the IP address of the second base station and the mobile identifier value.

23. The method as set forth in claim 21, further comprising the step, in response to the fifth message, of using the IF address of the second base station to establish a packet data bearer connection from the first base station to the second base station via the local IP network.

* * * * *

UNITED STATES PATENT AND TRADEMARK OFFICE
CERTIFICATE OF CORRECTION

PATENT NO. : 7,483,436 B2  Page 1 of 1
APPLICATION NO. : 10/695232
DATED : January 27, 2009
INVENTOR(S) : William J. Semper It is certified that error appears in the above-identified patent and that said Letters Patent is hereby corrected as shown below:

Column 2, line 16, delete "20,020,077,096" and replace with --2002/0077096--;

Column 9, line 32, delete "s" after the term "traffic";

Column 10, claim 4, line 19, delete "wit" and replace with --with--.

Signed and Sealed this

Second Day of February, 2010

David J. Kappos
*Director of the United States Patent and Trademark Office*